(12) United States Patent
Shon (10) Patent No.: US 11,211,808 B2
(45) Date of Patent: Dec. 28, 2021

(54) PHOTOVOLTAIC APPARATUS

(71) Applicant: LS ELECTRIC CO., LTD., Anyang-si (KR)

(72) Inventor: Sang-Ki Shon, Anyang-si (KR)

(73) Assignee: LS ELECTRIC CO., LTD, Anyang-si (KR)

(*) Notice: Subject to any disclaimer, the term of this patent is extended or adjusted under 35 U.S.C. 154(b) by 30 days.

(21) Appl. No.: 16/960,204

(22) PCT Filed: Jan. 11, 2019

(86) PCT No.: PCT/KR2019/000426
§ 371 (c)(1),
(2) Date: Jul. 6, 2020

(87) PCT Pub. No.: WO2019/151675
PCT Pub. Date: Aug. 8, 2019

(65) Prior Publication Data
US 2021/0066940 A1 Mar. 4, 2021

(30) Foreign Application Priority Data

Jan. 30, 2018 (KR) .................. 10-2018-0011382

(51) Int. Cl.
*H02J 7/00* (2006.01)
*H02S 40/32* (2014.01)
*H02S 40/38* (2014.01)
*H02J 7/35* (2006.01)

(52) U.S. Cl.
CPC ............ *H02J 7/0068* (2013.01); *H02J 7/005* (2020.01); *H02J 7/00712* (2020.01); *H02J 7/35* (2013.01); *H02S 40/32* (2014.12); *H02S 40/38* (2014.12); *H02J 2300/24* (2020.01)

(58) Field of Classification Search
CPC .. H02J 7/00; H02J 7/0068; H02J 7/005; H02J 7/00712; H02J 7/35; H02J 2300/24; H02S 40/32

See application file for complete search history.

(56) References Cited

FOREIGN PATENT DOCUMENTS

| KR | 20130066099 A | 6/2013 |
|---|---|---|
| KR | 20150033971 A | 4/2015 |
| KR | 20160028884 A | 3/2016 |
| KR | 20160098860 A | 8/2016 |
| KR | 101695218 B1 | 1/2017 |

OTHER PUBLICATIONS

Korean Office Action for related Korean Application No. 10-2018-0011382; action dated Jul. 10, 2020; (5 pages).

(Continued)

*Primary Examiner* — Robert L Deberadinis
(74) *Attorney, Agent, or Firm* — K&L Gates LLP (57) ABSTRACT

A photovoltaic apparatus according to an embodiment of the present invention may comprise: a photovoltaic cell array for generating electricity by using solar energy; a battery energy storage system for charging electric energy supplied from the photovoltaic cell array and discharging the charged electric energy to a system; and a processor for controlling a generated power amount to be supplied to the system on the basis of the generated power amount of the photovoltaic cell array and power consumption of the photovoltaic apparatus.

10 Claims, 4 Drawing Sheets (56) References Cited

OTHER PUBLICATIONS

International Search Report for related International Application No. PCT/KR2019/000426; report dated Aug. 8, 2019; (5 pages).
Written Opinion for related International Application No. PCT/KR2019/000426; report dated Aug. 8, 2019; (4 pages).
Yao, et al; Optimal Charging and Discharging Scheduling for Electric Vehicles in a Parking Station with Photovoltaic System and Energy Storage System; Energies 2017; vol. 10, No. 4; Apr. 17, 2017; (22 pages).

((Current generated power amount * Efficiency of battery) * Weight)−Power consumption < 0

Charging efficiency-based power

PHOTOVOLTAIC APPARATUS

CROSS-REFERENCE TO RELATED APPLICATIONS

The present application is a National Stage of International Application No. PCT/KR2019/000426, filed on Jan. 11, 2019, which claims the benefit of earlier filing date and right of priority to Korean Application No. 10-2018-0011382 filed on Jan. 30, 2018, the contents of which are all hereby incorporated by reference herein in their entirety.

FIELD OF THE INVENTION

The present disclosure relates to a solar photovoltaic apparatus that generates electricity using solar energy.

BACKGROUND OF THE INVENTION

Due to exhaustion of fossil energy such as petroleum and concerns about environmental pollution, interest in alternative energies is increasing. In this connection, a solar photovoltaic generator in which panels having solar photovoltaic cells attached thereto are arranged in an large area to generate electricity on a large scale using solar energy is attracting attention. The solar photovoltaic generator uses infinite and pollution-free solar energy, such that there is no fuel cost and no air pollution or waste.

The solar photovoltaic scheme includes a standalone scheme and a grid-connected scheme.

In the standalone scheme, a solar photovoltaic apparatus is connected to an independent load that is not connected to a grid.

In the grid-connected scheme, a solar photovoltaic apparatus is connected to a grid.

When electricity is generated from a solar photovoltaic apparatus in the daytime, the generated electricity is transmitted to the load. The electricity is supplied from the grid to the load during night or when it is rainy. In order to efficiently use a grid-connected solar photovoltaic apparatus, an idle power from the solar photovoltaic apparatus is stored in a battery-based energy storage system (BESS). In an overload event, the battery-based energy storage system, and the solar photovoltaic apparatus are discharged to supply power to the grid.

Currently, according to a government policy, solar photovoltaic power generated from 10 a.m. to 16 p.m. is used as power consumed to operate the solar photovoltaic plant and as power stored and sold in the battery-based energy storage system.

In order to maximize a profit from the solar photovoltaic power, it is important to store an amount of the power generated from 10 a.m. to 16 p.m. in the battery-based energy storage system and to sell the stored power amount later.

However, in a current solar photovoltaic plant, due to consumption power for operating the solar photovoltaic plant, power loss is inevitable. The power consumed for operating the solar photovoltaic plant may include power required for operation of internal components therein, power consumed for cooling the internal components, and the like.

In particular, when operating the solar photovoltaic plant in connection with the battery-based energy storage system, loss of power (e.g., power required for operations of the internal components) occurs in a process of charging/discharging the battery.

When current generated power amount generated by a solar photovoltaic cell array is smaller than the power consumption by the solar photovoltaic plant, providing DC power corresponding to the generated power amount to the battery-based energy storage system to charge the battery may be wasteful.

In this case, a sales revenue relative to the generated power amount of the solar photovoltaic cell array may be reduced. Thus, there occurs limitation in improving an operating profit of the solar photovoltaic apparatus.

BRIEF SUMMARY OF THE INVENTION

A purpose of the present disclosure is to provide a solar photovoltaic apparatus having improved operating profit.

In one aspect of the present disclosure, a solar photovoltaic apparatus for generating electricity using sunlight includes a solar photovoltaic cell array to generate power using solar energy; a battery-based energy storage system to charge electric energy supplied from the solar photovoltaic cell array to a battery thereof, and to discharge the charged electrical energy to a grid; and a processor configured to control the battery-based energy storage system to supply a generated power amount of the solar photovoltaic cell array to the grid, based on the generated power amount of the solar photovoltaic cell array and a power consumption of the solar photovoltaic apparatus.

The processor may be configured to: calculate a charging efficiency-based power based on the generated power amount of the solar photovoltaic cell array, a efficiency of the battery, and a weight; determine whether a charge condition for charging the battery-based energy storage system may be satisfied, based on a difference between the charging efficiency-based power and the consumption power of the solar photovoltaic apparatus; and select charging or discharging of the battery-based energy storage system and determine whether to supply the generated power amount to the grid, based on whether the charge condition may be satisfied.

The charging efficiency-based power may be a value obtained by multiplying the generated power amount of the solar photovoltaic cell array by the efficiency of the battery and the weight.

The processor may be configured to: when the charging efficiency-based power may be smaller than the consumption power, determine that the charge condition may be not satisfied; and select the discharging of the battery-based energy storage system to supply the generated power amount to the grid.

The processor may be configured to: when the charging efficiency-based power may be greater than the consumption power, determine that the charge condition may be satisfied; and select the charging of the battery-based energy storage system to charge the generated power amount into the battery.

The efficiency of the battery may correspond to a state of health (SOH) of the battery.

The efficiency of the battery may correspond to a ratio of a discharged amount to a charged amount of the battery.

The apparatus may further include a charge controller to control the charging and discharging of the battery-based energy storage system, wherein the processor may be configured to select the charging or the discharging of the battery-based energy storage system based on whether the charge condition may be satisfied, and then to control the charge controller based on the selection result.

The apparatus may further include a first direct current (DC)/alternating current (AC) converter to convert DC power corresponding to the generated power amount into first AC power; a first AC/AC converter to adjust a magnitude of the converted first AC power and provide the first AC power having the adjusted magnitude to the grid; a second DC/AC converter to convert DC power discharged from the battery-based energy storage system into second AC power; and a second AC/AC converter to adjust a magnitude of the converted second AC power and provide the second AC power having the adjusted magnitude to the grid.

The apparatus may further include a DC/DC converter to adjust a magnitude of DC power corresponding to the generated power amount; a DC/AC converter to convert the DC power having the adjusted magnitude to AC power; and an AC/AC converter to adjust a magnitude of the converted AC power.

According to various embodiments of the present disclosure, the generated power amount of the solar photovoltaic cell is stored in the battery-based energy storage system or is sold immediately, based on the generated power amount of the solar photovoltaic cell array and the power consumption of the solar photovoltaic apparatus. Thus, the sales revenue relative to the generated power amount of the solar photovoltaic cell may be improved. As a result, the operating profit of the solar photovoltaic apparatus may be improved.

DETAILED DESCRIPTION OF THE INVENTION

DETAILED DESCRIPTIONS

Hereinafter, exemplary embodiments of the present disclosure will be described in detail with reference to the accompanying drawings so that those skilled in the art to which the present disclosure belongs may easily implement the embodiments. However, the present disclosure may be implemented in many different forms and may not be limited to the embodiments illustrated herein. Further, in order to clearly illustrate the present disclosure, components not related to the present disclosure are omitted in the drawings. Similar reference numerals are used for similar elements throughout the specification.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Figure 1:
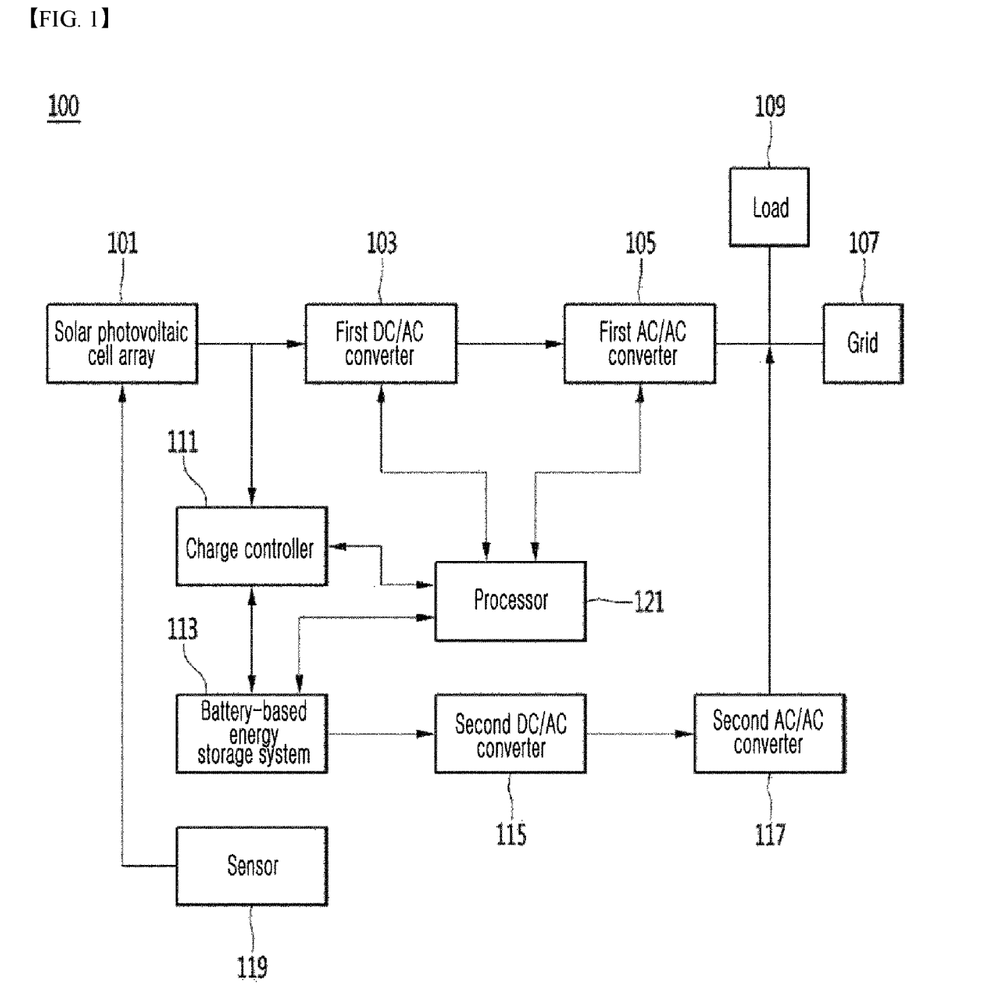
FIG. 1 is a block diagram for illustrating a configuration of a solar photovoltaic apparatus according to an embodiment of the present disclosure.

FIG. 1 is a block diagram of a solar photovoltaic apparatus according to an embodiment of the present disclosure.

A solar photovoltaic apparatus 100 according to one embodiment of the present disclosure may include a solar photovoltaic cell array 101, a first DC/AC converter 103, a first AC/AC converter 105, a grid 107, a load 109, a charge controller 111, a battery-based energy storage system 113, a second DC/AC converter 115, a second AC/AC converter 117, a sensor 119, and a processor 121.

The solar photovoltaic cell array 101 uses sunlight to generate electricity. Specifically, the solar photovoltaic cell array 101 absorbs solar energy, and converts absorbed solar energy into electrical energy. In this connection, the electric energy generated by the solar photovoltaic cell array 101 may have a form of DC power.

The first DC/AC converter 103 may convert DC power to AC power.

Specifically, the first DC/AC converter 103 may convert the DC power supplied from the solar photovoltaic cell array 101 to AC power.

The first AC/AC converter 105 may adjust a magnitude of AC power so that the adjusted AC power may be supplied to the grid 107 and the load 109. Thus, the converted AC power may be supplied to the grid 107 and the load 109.

An AC filter (not shown) may be further disposed between the first DC/AC converter 103 and the first AC/AC converter 105. The AC filter may filter noise of the converted AC power.

The grid 107 may refer to a system in which a power plant, a substation, transmission and distribution lines, and a loads are integrated with each other and thus power is generated and is used.

The charge controller 111 may control charge and discharge of the battery-based energy storage system 113.

The battery-based energy storage system 113 may receive the electric energy from the solar photovoltaic cell array 101 to charge the battery. The battery-based energy storage system 113 may discharge the charged electric energy from the battery depending on a power supply and demand situation of the grid 107 or the load 109.

The battery-based energy storage system 113 may include a plurality of batteries.

The second DC/AC converter 115 may convert the DC power discharged from the battery-based energy storage system 113 into AC power.

The second AC/AC converter 117 may adjust a magnitude of the converted AC power such that the adjusted AC power is supplied to the grid 107 and the load 109.

An AC filter (not shown) may be further disposed between the second DC/AC converter 115 and the second AC/AC converter 117. The AC filter may filter noise of the converted AC power.

The load 109 may consume electrical energy provided from the solar photovoltaic cell array 101 or from the battery-based energy storage system 113.

The sensor 119 may collect sensing information about a state of the solar photovoltaic apparatus 100 and about surrounding environment around the solar photovoltaic apparatus 100.

Specifically, the sensor 119 may detect the state of the solar photovoltaic apparatus 100.

In this connection, the state of the solar photovoltaic apparatus 100 may include at least one of a voltage of the power generated by the solar photovoltaic apparatus 100 or a temperature in the solar photovoltaic apparatus 100.

Further, the sensor 119 may detect a state of the surrounding environment around the solar photovoltaic apparatus 100. In this connection, the state of the surrounding environment around the solar photovoltaic apparatus 100 may include at least one of solar radiation at a location where the solar photovoltaic apparatus 100 is disposed, and a temperature at a location which the solar photovoltaic apparatus 100 is disposed. Therefore, the sensor 119 may include a plurality of sensors. Specifically, the sensor 119 may include at least one of a solar radiation sensor, a temperature sensor, or a voltage sensor.

The processor 121 may control an overall operation of the solar photovoltaic apparatus 100.

In an embodiment of the present disclosure, the charge controller 111 is illustrated as a separate component. This is only an example. The present disclosure is not limited thereto. The charge controller 111 may be included in the processor 121.

Figure 2:
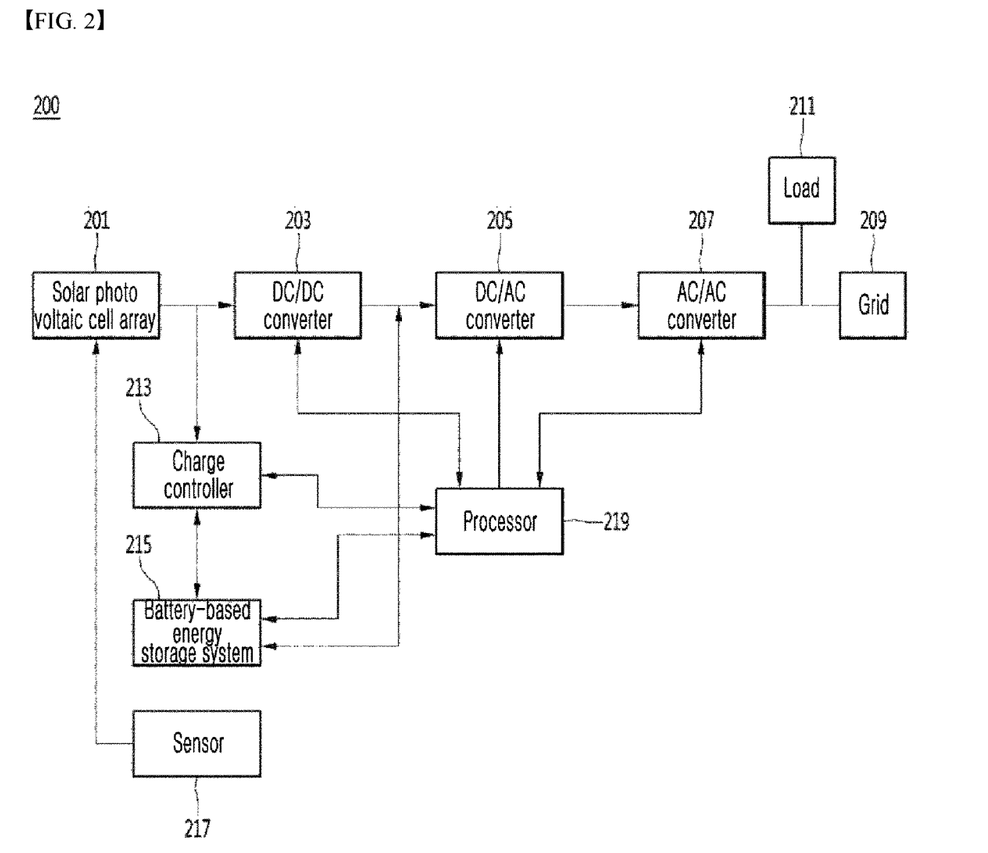
FIG. 2 is a block diagram illustrating a configuration of a solar photovoltaic apparatus according to another embodiment of the present disclosure.

FIG. 2 is a block diagram illustrating a configuration of a solar photovoltaic apparatus according to another embodiment of the present disclosure.

Referring to FIG. 2, a solar photovoltaic apparatus 200 according to another embodiment of the present disclosure may include a solar photovoltaic cell array 201, a DC/DC converter 203, a DC/AC converter 205, an AC/AC converter 207, a grid 209, a load 211, a charge controller 213, a battery-based energy storage system 215, a sensor 217, and a processor 219.

The solar photovoltaic cell array 201 may absorb solar energy and convert the absorbed solar energy into electrical energy. The converted electrical energy may have a form of DC power.

The DC/DC converter 203 may adjust a magnitude of DC power provided from the solar photovoltaic cell array 201.

The DC/AC converter 205 may convert the DC power having the adjusted magnitude into AC power.

The AC/AC converter 207 may adjust a magnitude of the AC power such that the AC power having the adjusted magnitude is supplied to the grid 209 and the load 211.

An AC filter (not shown) may be further disposed between the DC/AC converter 205 and the AC/AC converter 207. The AC filter may filter noise of AC power.

The grid 209 may refer to a system in which a power plant, a substation, transmission and distribution lines, and a loads are integrated with each other and thus power is generated and is used.

The load 211 may consume electric energy provided from the solar photovoltaic cell array 201 or from the battery-based energy storage system 215.

The charge controller 213 may control charge and discharge of the battery-based energy storage system 215.

The battery-based energy storage system 215 may receive the electric energy from the solar photovoltaic cell array 201 to charge the battery. The battery-based energy storage system 215 may discharge the charged electric energy from the battery depending on a power supply and demand situation of the grid 209 or the load 211.

The sensor 217 may collect state information of the solar photovoltaic apparatus 100 and surrounding environment around the solar photovoltaic apparatus 100. Details of the sensor 217 may refer to those of the sensor 119 in FIG. 1.

The processor 219 may control an overall operation of the solar photovoltaic apparatus 200.

The processor 219 may acquire a current generated power amount of the solar photovoltaic cell array 201.

The processor 219 may determine whether a charge condition for charging the battery-based energy storage system 215 is satisfied, based on the acquired current generated power amount.

In one embodiment, whether the charge condition is satisfied may be determined based on a difference between a charging efficiency-based power in consideration of a battery efficiency and a selling price of the generated power amount and a power consumption of the solar photovoltaic apparatus 200.

Whether the charge condition is satisfied will be described later in detail.

When the processor 219 determines that the charge condition is satisfied, the processor 219 may trigger charging of the battery-based energy storage system 215 to charge DC power corresponding to a current generated power amount of the solar photovoltaic cell array 201 to the battery-based energy storage system 215.

When the processor 219 determines that the charge condition is not satisfied, the processor 219 may trigger discharging of the battery-based energy storage system 215 to supply DC power corresponding to the generated power amount of the solar photovoltaic cell array 210 to the grid 209.

When comparing the solar photovoltaic apparatus 100 according to the embodiment of FIG. 1 and the solar photovoltaic apparatus 200 according to the embodiment of FIG. 2, the solar photovoltaic apparatus 200 according to the embodiment of FIG. 2 is free of one DC/AC converter and one AC/AC converter which is included in the solar photovoltaic apparatus 100 according to the embodiment of FIG. 1, and the DC/DC converter not included in the solar photovoltaic apparatus 100 according to the embodiment of FIG. 1 is added to the solar photovoltaic apparatus 200 according to the embodiment of FIG. 2.

Accordingly, a cost of the solar photovoltaic apparatus 200 according to the embodiment of FIG. 2 may be reduced than a cost of the solar photovoltaic apparatus 100 according to the embodiment of FIG. 1.

Further, the solar photovoltaic apparatus 100 according to the embodiment of FIG. 1 has a conventional simple combination between a solar photovoltaic generator and a battery-based energy storage system, and, thus, has a power efficiency of 80%. However, the solar photovoltaic apparatus 200 according to the embodiment of FIG. 2 has an organic combination between a solar photovoltaic generator and a battery-based energy storage system, and, thus, has an increased power efficiency of 90%.

Figure 3:
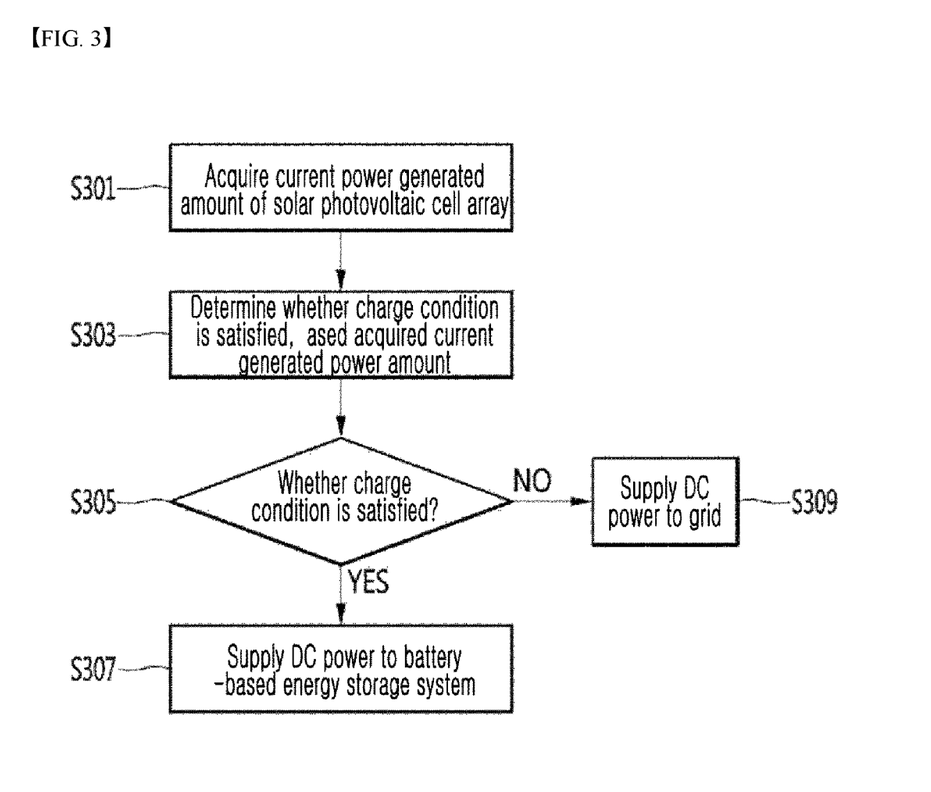
FIG. 3 is a flowchart illustrating an operation method of a solar photovoltaic apparatus according to an embodiment of the present disclosure.

FIG. 3 is a flowchart illustrating an operation method of a solar photovoltaic apparatus according to an embodiment of the present disclosure.

A following embodiment may be applied to both the solar photovoltaic apparatus 100 according to the embodiment of FIG. 1 and the solar photovoltaic apparatus 200 according to the embodiment of FIG. 2.

Hereinafter, for convenience, it is assumed that the solar photovoltaic apparatus 200 according to the embodiment of FIG. 2 performs following processes.

Referring to FIG. 3, the processor 219 acquires a current power generated amount of the solar photovoltaic cell array 201 S301.

In one embodiment, the processor 219 may acquire the amount of the power generated by the solar photovoltaic cell array 201 through a power meter placed in the sensor 217.

The processor 219 determines whether the charge condition for charging the battery-based energy storage system 215 is satisfied, based on the acquired current generated power amount S303.

In one embodiment, whether the charge condition is satisfied may be determined based on a difference between the charging efficiency-based power in consideration of the battery efficiency and the selling price of the generated power amount and the power consumption of the solar photovoltaic apparatus 200.

The charging efficiency-based power may refer to a value obtained by multiplying the current generated power amount by a battery efficiency and a weight.

When the charging efficiency-based power is greater than the consumption power of the solar photovoltaic apparatus 200, the processor 219 may determine that the charge condition of the battery-based energy storage system 251 is satisfied.

When the charging efficiency-based power is smaller than or equal to the consumption power of the solar photovoltaic apparatus 200, the processor 219 may determine that the charge condition of the battery-based energy storage system 251 is not satisfied.

This is illustrated with reference to FIG. 4.

Figure 4:
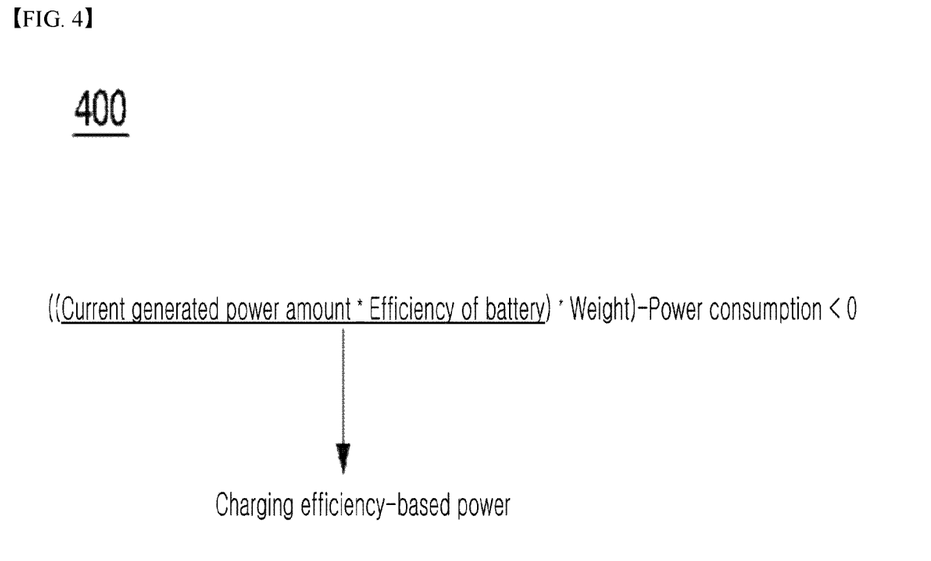
FIG. 4 is a diagram illustrating a charge condition relationship used to determine whether a charge condition for charging a battery-based energy storage system is satisfied according to an embodiment of the present disclosure.

FIG. 4 is a diagram illustrating a charge condition relationship used to determine whether a charge condition for charging a battery-based energy storage system is satisfied according to an embodiment of the present disclosure.

The charging condition relationship 400 may be configured using the current generated power amount of the solar photovoltaic cell array 201, the battery efficiency, the weight, and the power consumption of the solar photovoltaic apparatus 200.

In one embodiment, the efficiency of the battery may be determined based on SOH (State of Health) of the battery. When the efficiency of the battery is determined based on the SOH of the battery, the efficiency of the battery may vary depending on a ratio determined by a battery manufacturer.

In another embodiment, the efficiency of the battery may be calculated based on a ratio between charged and discharged amounts of the battery. For example, when the charged amount of the battery is 1, and the discharged amount thereof is 0.8, the efficiency of the battery may be 0.8.

The efficiency of the battery may be calculated on a daily basis and may vary.

The efficiency of the battery may be replaced with that of the battery-based energy storage system 215.

The weight may increase as a selling price of the charged power from the battery-based energy storage system 215 increases. The weight may be 5. This is only an example.

The consumption power of the solar photovoltaic apparatus 200 may include power consumed for operations of the internal components of the solar photovoltaic apparatus 200, and power consumed for cooling the internal components thereof.

The value obtained by multiplying the current generated power amount by the battery efficiency and the weight may be referred to as the charging efficiency-based power.

When the charging efficiency-based power is smaller than or equal to the consumption power of the solar photovoltaic apparatus 200, the processor 219 may determine that the charge condition is not satisfied.

When the charging efficiency-based power is greater than the consumption power of the solar photovoltaic apparatus 200, the processor 219 may determine that the charge condition is satisfied.

When it is determined that the charge condition is satisfied S305, the processor 219 supplies DC power corresponding to the current generated power amount of the solar photovoltaic cell array 201 to the battery-based energy storage system 215 S307.

That is, when the processor 219 determines that the current generated power amount overcomes the consumption power of the solar photovoltaic apparatus 200, the processor 219 may control the charge controller 213 to charge the DC power corresponding to the current generated power amount to the battery-based energy storage system 215.

The power charged in the battery-based energy storage system 215 may be sold at a higher price than a selling price of power not going through the battery-based energy storage system 215.

When the current generated power amount is large enough to overcome a power loss, the processor 219 may choose to charge the battery-based energy storage system 215. An operator of the solar photovoltaic apparatus 200 may earn a high profit due to a high selling price of the power charged in the battery-based energy storage system 215.

When the processor 219 determines that the charge condition is not satisfied, S305, the processor 219 may choose to discharge the battery-based energy storage system 215 to supply the DC power corresponding to the generated power amount of the solar photovoltaic cell array 210 to the grid 209 S309.

That is, when the charge condition for charging the battery-based energy storage system 215 is not satisfied, the processor 219 may control the charge controller 213 not to provide the DC power corresponding to the generated power amount to the battery-based energy storage system 215.

At the same time, the processor 219 may control the charge controller 213 to supply the DC power corresponding to the generated power amount of the solar photovoltaic cell array 201 to the grid 209.

Thus, the generated power amount of the solar photovoltaic cell array 201 is not supplied to the battery-based energy storage system 215, but is sold to the grid 209.

When charging the battery-based energy storage system 215 with the amount of the power generated in the solar photovoltaic cell array 201 while the charge condition is not met, the consumption power is greater than the charging efficiency-based power, such that power loss occurs.

Thus, when the charge condition is not met, the operator operating the solar photovoltaic apparatus 200 may immediately sell the amount of the power generated from the solar photovoltaic cell array 201. Accordingly, the operator may take the profit corresponding to the generated power amount.

According to an embodiment of the present disclosure, processor 219 may periodically perform S301 to S309. One period may be any one of 1 day, 1 hour, and 10 minutes. However, this is only an example.

Features, structures, effects, etc. disclosed in the above embodiments are included in at least one embodiment of the present disclosure, and is not necessarily limited to one embodiment. Furthermore, features, structures, effects, etc. disclosed in each embodiment may be combined or modified with respect to other embodiments by a person having ordinary knowledge in the field to which the embodiments belong. Therefore, these combinations and variations should be interpreted as being included in the scope of the present disclosure.

The disclosure is set forth based on the embodiments. However, the embodiments are merely exemplary and do not limit the present disclosure. Those of ordinary skill in the field to which the present disclosure belongs will appreciate that various modifications and applications as not described above are possible without departing from the essential features of the embodiments. For example, each component specifically shown in the embodiment may be modified.

These modifications and applications should be interpreted as being included in the scope of the present disclosure defined in the appended claims.

What is claimed is:

1. A solar photovoltaic apparatus for generating electricity using sunlight, the apparatus comprising:
   a solar photovoltaic cell array to generate power using solar energy;
   a battery-based energy storage system to charge electric energy supplied from the solar photovoltaic cell array to a battery thereof, and to discharge the charged electrical energy to a grid; and
   a processor configured to control the battery-based energy storage system to supply a generated power amount of the solar photovoltaic cell array to the grid, based on the generated power amount of the solar photovoltaic cell array and a power consumption of the solar photovoltaic apparatus.

2. The apparatus of claim 1, wherein the processor is configured to:
   calculate a charging efficiency-based power based on the generated power amount of the solar photovoltaic cell array, a efficiency of the battery, and a weight;
   determine whether a charge condition for charging the battery-based energy storage system is satisfied, based on a difference between the charging efficiency-based power and the consumption power of the solar photovoltaic apparatus; and
   select charging or discharging of the battery-based energy storage system and determine whether to supply the generated power amount to the grid, based on whether the charge condition is satisfied.

3. The apparatus of claim 2, wherein the charging efficiency-based power is a value obtained by multiplying the generated power amount of the solar photovoltaic cell array by the efficiency of the battery and the weight.

4. The apparatus of claim 3, wherein the processor is configured to:
   when the charging efficiency-based power is smaller than the consumption power,
   determine that the charge condition is not satisfied; and
   select the discharging of the battery-based energy storage system to supply the generated power amount to the grid.

5. The apparatus of claim 4, wherein the processor is configured to:
   when the charging efficiency-based power is greater than the consumption power,
   determine that the charge condition is satisfied; and
   select the charging of the battery-based energy storage system to charge the generated power amount into the battery.

6. The apparatus of claim 2, wherein the efficiency of the battery corresponds to a state of health (SOH) of the battery.

7. The apparatus of claim 2, wherein the efficiency of the battery corresponds to a ratio of a discharged amount to a charged amount of the battery.

8. The apparatus of claim 2, wherein the apparatus further comprises a charge controller to control the charging and discharging of the battery-based energy storage system,
   wherein the processor is configured to select the charging or the discharging of the battery-based energy storage system based on whether the charge condition is satisfied, and then to control the charge controller based on the selection result.

9. The apparatus of claim 1, wherein the apparatus further comprises:
   a first direct current (DC)/alternating current (AC) converter to convert DC power corresponding to the generated power amount into first AC power;
   a first AC/AC converter to adjust a magnitude of the converted first AC power and provide the first AC power having the adjusted magnitude to the grid;
   a second DC/AC converter to convert DC power discharged from the battery-based energy storage system into second AC power; and
   a second AC/AC converter to adjust a magnitude of the converted second AC power and provide the second AC power having the adjusted magnitude to the grid.

10. The apparatus of claim 1, wherein the apparatus further comprises:
    a DC/DC converter to adjust a magnitude of DC power corresponding to the generated power amount;
    a DC/AC converter to convert the DC power having the adjusted magnitude to AC power; and
    an AC/AC converter to adjust a magnitude of the converted AC power.

* * * * *